(12) United States Patent
Veshchikov

(10) Patent No.: US 12,499,285 B2
(45) Date of Patent: Dec. 16, 2025

(54) TAMPER DETECTION FOR AN ENCLOSURE OF AN ELECTRONIC DEVICE

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 183 days.

(21) Appl. No.: 18/363,843

(22) Filed: Aug. 2, 2023

(65) Prior Publication Data

US 2025/0045469 A1  Feb. 6, 2025

(51) Int. Cl.
*G06F 21/86* (2013.01)

(52) U.S. Cl.
CPC .................... *G06F 21/86* (2013.01)

(58) Field of Classification Search
CPC .......... G06F 21/75; G06F 21/79; G06F 21/86; G06F 21/87; G06F 2221/2143; G08B 29/046
See application file for complete search history.

(56) References Cited

U.S. PATENT DOCUMENTS

| | | |
|---|---|---|
| 4,749,938 A | 6/1988 | Bishop |
| 6,995,353 B2 | 2/2006 | Beinhocker |
| 8,531,292 B2 | 9/2013 | Dagher et al. |
| 9,341,014 B2 * | 5/2016 | Oshima .................. H04B 10/11 |
| 9,990,709 B2 * | 6/2018 | Sawada ................. G06T 3/4053 |
| 10,306,753 B1 | 5/2019 | Fadden et al. |
| 10,327,329 B2 | 6/2019 | Brodsky et al. |
| 10,469,694 B2 * | 11/2019 | Chang .................... H10K 39/32 |
| 10,531,561 B2 | 1/2020 | Fadden et al. |
| 10,966,306 B1 * | 3/2021 | Recker ................... H05B 45/20 |
| 10,999,914 B1 * | 5/2021 | Recker ................... H05B 47/16 |
| 11,271,901 B2 * | 3/2022 | Gremaud ............ H04L 63/0272 |
| 2010/0053706 A1 | 3/2010 | Jasinski et al. |
| 2022/0401657 A1 * | 12/2022 | Krulevitch .............. A61M 5/20 |
| 2022/0417685 A1 * | 12/2022 | Svajda ..................... H04R 1/04 |
| 2025/0022112 A1 * | 1/2025 | Nelson .................. G06T 7/0002 |

FOREIGN PATENT DOCUMENTS

| | | |
|---|---|---|
| JP | 4293881 B2 | 7/2009 |
| WO | 2007046018 A1 | 4/2007 |

OTHER PUBLICATIONS

Esbach, Thomas et al.; "A New Security Architecture for Smartcards Utilizing PUFs"; ISEE 2012 Securing Electronic Business Processes; Information Security Solutions Europe Conference (ISSE) 2012, Brussels, Belgium; First Online: Dec. 11, 2012.

\* cited by examiner

*Primary Examiner* — Hosuk Song

(57) ABSTRACT

A tamper detection system for detecting tampering of an enclosure of an electronic device is provided. The tamper detection system includes a light source and a light sensor both mounted inside the enclosure and connected to a tamper detection circuit. The light sensor is spaced apart and separate from the light source. The light sensor is configured to sense light emitted by the light source, the light sensed by the light sensor having a characteristic. A characteristic of the sensed light is stored during an initialization phase. During normal operation, the tamper detection circuit is configured to turn the light source on and off on a predetermined time interval. Tampering of the enclosure is detected when the light sensed by the light sensor does not compare favorably to the stored characteristic. In another embodiment, a method for detecting tampering is provided.

18 Claims, 4 Drawing Sheets

TAMPER DETECTION FOR AN ENCLOSURE OF AN ELECTRONIC DEVICE

BACKGROUND

Field

This disclosure generally relates to tamper detection, and more particularly, to tamper detection for an enclosure of an electronic device.

Related Art

Many types of attacks on electronic devices require the attacker to obtain access to the inside of an enclosure that houses the electronic device. Once the attacker gains access to the electronic device, the attacker can proceed with a next step of the attack. The electronic device may include a printed circuit board (PCB) with wires and other conductors, integrated circuits, discrete components, and electrical connectors that would be accessible after the enclosure is opened. To prevent opening of the enclosure, device manufacturers may use screws or glue to secure the enclosure. Some manufactures may use enclosures that cannot be opened without destroying them. Further, sensors may be placed inside an enclosure to detect when the enclosure is opened.

Light sensors are among the different types of sensors that can be used to detect that the enclosure of the device is open. When the enclosure is closed the light sensors do not detect any light but when the enclosure is open the light sensors will detect the light entering the opened enclosure. In some cases, an attacker may be able to trick the light sensor to provide a specific value either by covering it, pointing a light source onto it, or using a jumper wire to prevent a tampering alert.

Therefore, what is needed is a method and tamper detection system to detect tampering with an electronic device enclosure that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
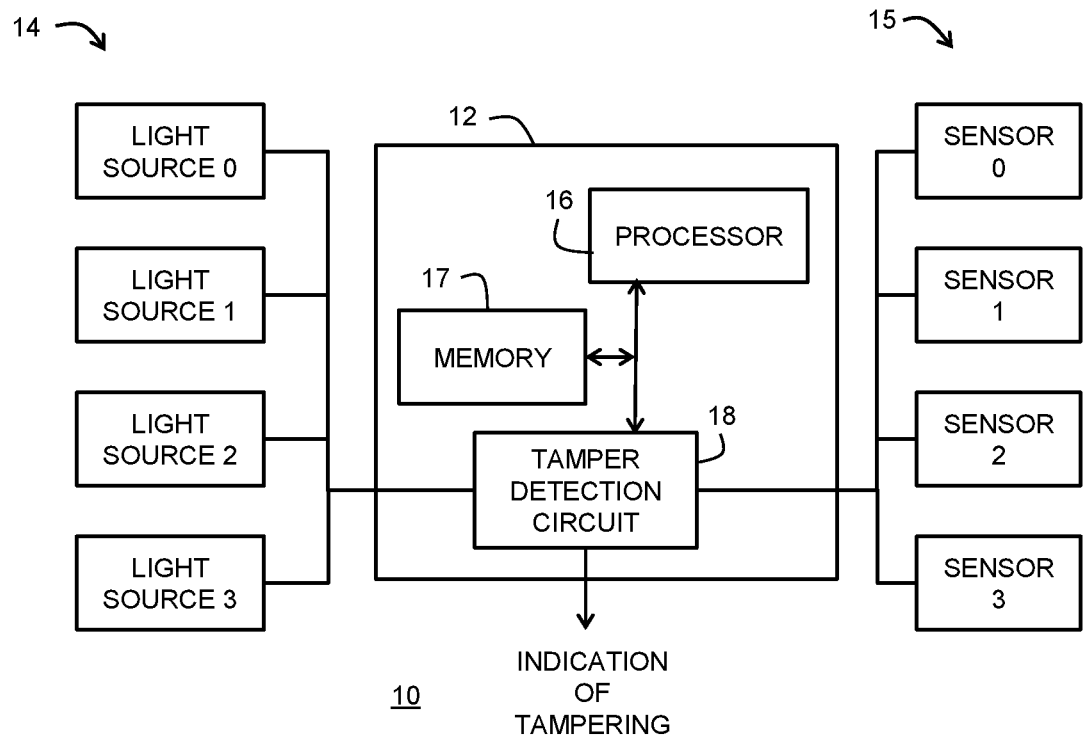
FIG. 1 illustrates a block diagram of a tamper detection system according to an embodiment.

Generally, there is provided, a system configured to detect tampering of an electronic device enclosure. The system includes light sources, light sensors, and a tamper detection circuit. The light sources and light sensors are arranged within the electronic device enclosure to detect different forms of tampering with the electronic device enclosure including deformation and opening of the enclosure. In one embodiment, the light sources are dynamically turned on and off while checking if specific sets of sensors detect light during specific time intervals while the electronic device operates. In one embodiment, the light sources are turned on and off randomly.

Turning the light sources on and off at specific times makes it more difficult for an attacker to open the enclosure without being detected.

In accordance with an embodiment, there is provided, a tamper detection system for an enclosure of an electronic device, including: a light source mounted inside the enclosure; a light sensor mounted inside the enclosure, the light sensor spaced apart and separate from the light source, wherein the light sensor is configured to sense light emitted by the light source, the light sensed by the light sensor having a characteristic; a tamper detection circuit connected to the light source and the light sensor, the tamper detection circuit configured to turn the light source on and off on a predetermined time interval, and to detect tampering of the enclosure when light sensed by the light sensor does not compare favorably to a stored characteristic. The tamper detection system may further include a reflective material positioned in the enclosure to reflect the emitted light from the light source to the light sensor. The stored characteristic may include one or more of wavelength and intensity. The tamper detection system may further include a plurality of light sources and light sensors, each light source of the plurality of light sources being selectivity turned on for a predetermined time interval, wherein the predetermined time interval is different for each of the light sources. The light source and the light sensor may be randomly turned on and off. The light sensor may further include an array of sensors. The stored characteristic may be recorded during an initialization phase of the tamper detection system during a normal untampered with condition of the enclosure to produce the stored characteristic. The characteristic of the light may be stored in a non-volatile memory of a secure element. The tamper detection system may further include a plurality of light sources and a plurality of light sensors organized as light source and sensor pairs, wherein each of the light source and sensor pairs may be configured to emit and sensor light of a different wavelength than other light source and sensor pairs of the tamper detection system. The tamper detection system may further include an opaque barrier between the light source and the light sensor, wherein the opaque barrier is configured to break when the enclosure is tampered with.

In another embodiment, there is provided, a method for detecting tampering of an enclosure of an electronic device, the method including: emitting light using a light source mounted on an inside of the enclosure during a normal operation of the electronic circuit; sensing light using a light sensor mounted inside the enclosure during the normal operation, the light sensor spaced apart and separate from the light source, wherein the light source is turned on and off on a predetermined time interval; comparing a characteristic of the light sensed during the normal operation to a stored characteristic; and detecting tampering with the enclosure when the light sensed during the normal operation compares favorably to the stored characteristic. The method may further include: during an initialization phase, emitting light from the light source; sensing the emitted light, during the initialization phase, using the light sensor mounted inside the enclosure; and storing the characteristic of the light sensed by the light sensor to produce the stored characteristic. The method may further include reflecting the emitted light from the light source to the light sensor with a reflective material positioned in the enclosure. The stored characteristic may include one or more of wavelength and intensity. The method may further include a non-reflective material positioned within the enclosure between the light source and the light sensor to block a part of the light sensed by the light sensor. The method may further include randomly turning the light source on for the predetermined time interval. The light sensor may further include an array of sensors.

In yet another embodiment, there is provided, a method for detecting tampering of an enclosure of an electronic device, the method including: during an initialization phase, emitting light from a light source mounted inside the enclosure; sensing the emitted light, during the initialization phase, using a light sensor mounted inside the enclosure, wherein the light sensor is spaced apart and separate from the light source; storing a characteristic of the light sensed by the light sensor; during a normal operation of the electronic circuit, emitting light using the light source; during the normal operation, sensing light from the light source using the light sensor, wherein the light source is turned on and off on a predetermined time interval; and comparing a characteristic of the light sensed during the normal operation to the stored characteristic; and detecting tampering with the enclosure when the light sensed during the normal operation compares favorably to the stored characteristic. The stored characteristic may include one or more of wavelength and intensity. The method may further include reflecting the emitted light from the light source to the light sensor with a reflective material positioned in the enclosure.

FIG. 1 illustrates a block diagram of tamper detection system 10 according to an embodiment. Tamper detection system 10 includes integrated circuit (IC) 12, plurality of light sources 14, and plurality of light sensors 15. Integrated circuit 12 includes processor 16, memory 17, and tamper detection circuit 18. Tamper detection circuit 18 may share usage of IC 12 with other processes and applications. Processor 16 may be, for example, a microprocessor, field programmable gate array (FPGA), application-specific integrated circuit (ASIC), or similar device. Processor 16 may be an ARM, RISC-V or any other type of processor architecture. Processor 16 executes instructions of a computer program stored in memory 17. Memory 17 is representative of all memory of IC 12, and may include one or more of an instruction memory, cache, and data memory. A profile, also called a template, which may be created during an initialization phase of tamper detection system 18 may be stored in a portion of memory 17. In one embodiment, the portion of memory 17 for storing the profile is a relatively secure non-volatile memory portion. The NVM may be part of a secure element (not shown). The stored profile may include, for example, characteristics of the light such as intensity and luminosity detected by each of plurality of light sensors 15 that was emitted from plurality of light sources 14 during a normal closed condition of an enclosure (not shown) in which tamper detection system 10 is installed. Note that in one example embodiment, the enclosure, when closed and untampered with, admits no light from outside the enclosure. In one embodiment, the portion of memory 17 for storing the profile may be a secure non-volatile memory, such as provided in a secure element (not shown). Tamper detection circuit 18 controls the operation of plurality of light sources 14 and plurality of light sensors 15. For example, tamper detection circuit 18 may control when each light source of plurality of lights sources 14 turns on and off. Also, tamper detection circuit 18 controls a comparison of sensed light by each light sensor of plurality of light sensors 15 with the profile stored in memory 17, and provides an indication of tampering when the light sensed and the profile do not match within a predetermined tolerance.

Figure 2:
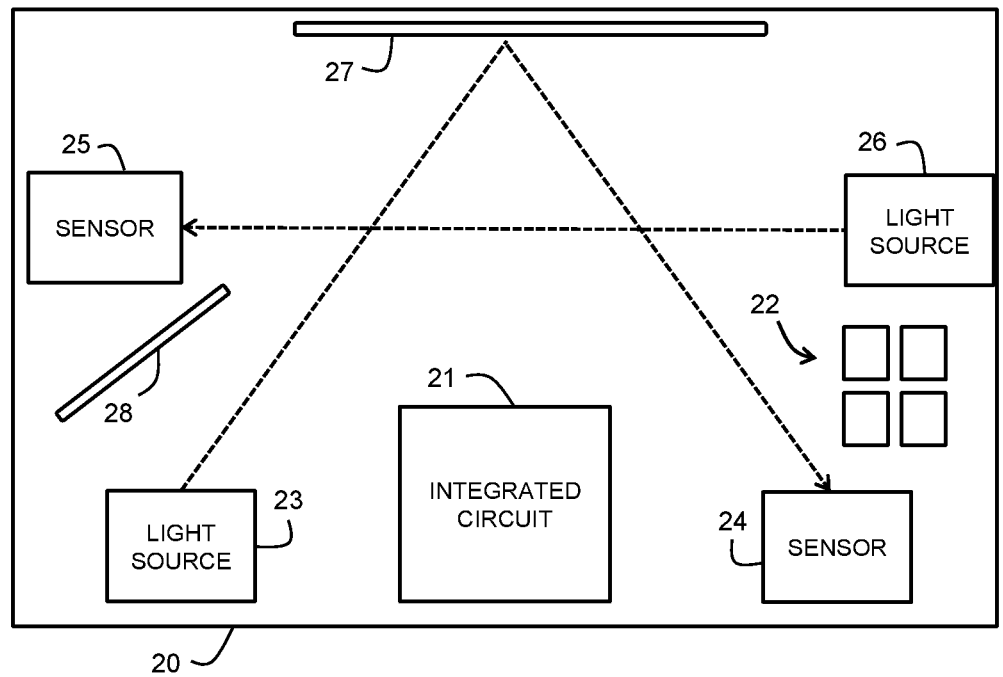
FIG. 2 illustrates an electronic device enclosure with a tamper detection system according an embodiment.

FIG. 2 illustrates electronic device enclosure 20 with a tamper detection system according an embodiment. FIG. 2 shows an example placement of tamper detection components according to one embodiment. The arrangement of components inside enclosure 20 is only one example arrangement. There may be any number of light sensors, light sources, and reflective and non-reflective materials in other embodiments. Note that electronic device enclosure 20 and components are not drawn to scale. Shown inside enclosure 20 is IC 21, other electrical and electronic components 22, light sources 23 and 26, sensors 24 and 25, reflector 27, and non-reflective material 28. A tamper detection circuit such as shown in FIG. 1 may be included in IC 21. Integrated circuit 21 and other electronic components 22 may be mounted on a printed circuit board (PCB). The enclosed electronic device, may be, e.g., a medical device, portion of a security system, a controller in an automobile, etc. Just as an example implementation, light source 26 is positioned to illuminate light sensor 25. Reflector 27 reflects light from light source 23 to light sensor 24. Non-reflective material may be positioned between light sensor 25 and light source 23 to limit how much light is received by light sensor 25. While enclosure 20 is closed, that is, no light is entering for outside the enclosure, light sensors 24 and 25 receive a certain amount of light from light sources 23 and 26. If the enclosure is opened, ambient light from outside enclosure 20 will also illuminate light sensors 24 and 25 and therefore change the amount of light sensed. This change in light sensed will be detected by a tamper detection circuit such as tamper detection circuit 18 in FIG. 1, by comparing a characteristic of the sensed light with a stored characteristic, thus allowing an appropriate action to be taken.

In one embodiment, the internal side of enclosure 20 that covers the PCB and other components of the device can be partially reflective to reflect a certain amount or all the light from the light sources to the light sensors as shown in FIG. 2. In one embodiment, during specified operations performed by integrated circuit 21, a specific set of light sources of a plurality of light sources, which may also be called light emitters, is enabled. The set of light sensors record a specific amount of light from the set of light sources. Each of the light sensors of the set of light sensors may not all receive the same amount of light. For example, the amount of light received by a light sensor depends on various factors such as placement of the light sources and light sensors in relation to each other and in relation to reflectors, distance from the light sources, and the luminosity of light sources, etc. The amount of light recorded, or other characteristic of the sensed light for each sensor is stored in memory for access by the tamper detection circuit.

Figures 3, 4:
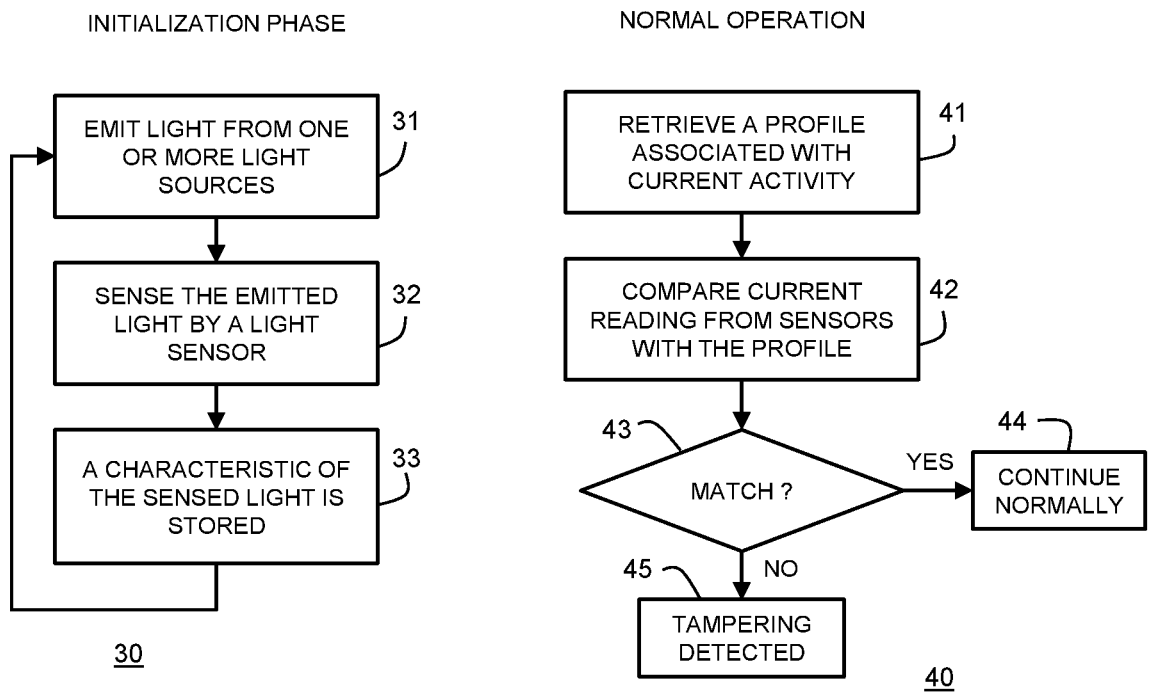
FIG. 3 illustrates an initialization phase of a method for detecting tampering of an enclosure according to an embodiment.
FIG. 4 illustrates a normal operation phase of a method for detecting tampering of an enclosure according to an embodiment.

FIG. 3 illustrates an initialization method 30 to initialize an electronic device to detect tampering of an enclosure according to an embodiment. During the setup or initialization of the electronic device enclosure, at block 31, light is emitted from a light source or plurality of light sources depending on how many are to be initialized. At block 32, the emitted light is sensed by one or more light sensors. At block 33, a characteristic of the sensed light is recorded and stored in memory to create a profile. The profile will be used as a reference of the normal function of the device and absence of tampering. This initialization method may be performed before using the plurality of light sources to detect tampering. During the initialization of the system, method 30 is performed and the characteristics stored for all sets of light sources that are to be turned on at the same time. There may be one or more sets of light sources to be initialized.

Note, that a stored profile may not be identical to a later recorded profile due to measurement errors caused by, e.g., electrical noise or slow degradation of light sources, sensors, wires, reflective and non-reflective materials, battery as well as other electronic components that constitute the electronic device. Nevertheless, such slow degradation can be dealt with by either making a new profile from time-to-time or modeling the degradation process and taking it into account. Note, that for most practical use-cases, such degradation and mismatch will be small, probably on the scale of the noise contributing to a mismatch between the measurement and the profile. In one embodiment, the template should be stored in a secure memory so that it cannot be altered by malicious software.

FIG. 4 illustrates method 40 for detecting tampering with an enclosure according to an embodiment. Method 40 can be used after method 30 is performed and a profile is saved. At block 41, a profile is retrieved that is associated with a current activity of the electronic device in the enclosure. In one embodiment, the profile was created using method 30 and includes a characteristic of the received light during initialization. At block 42, during the normal operation of the electronic device the characteristic of the light received by the sensors is compared to the characteristic stored during the initialization as a part of the profile. The characteristic may be, e.g., an intensity of the light. At decision block 43, if the characteristic of the light measured during normal operation matches with the stored characteristic, then it is assumed the enclosure of the electronic device was not damaged or opened, and operation continues at block 44. If the characteristic of light does not match with the stored characteristic, then an indication is provided at block 45. In addition to the indication of tampering, an attempt to mitigate the attack may be undertaken. For example, a memory in the device may be erased, the intrusion may be logged and counted, the indication of the attack may be sent to a server, a health check may be run, the electronic device may be reset to default settings, an error message may be displayed, authentication may be requested from the user of the device, an alert may be emailed to a manager or owner of the device, etc.

In one embodiment, the system turns the light sources on and off dynamically. That is, the light sources are not always on but are turned on and off at preselected times. A plurality of light sources may be divided into multiple subsets of one or more light sources. There are multiple ways for deciding when and what subset of light sources to turn on and when to change the subset that is turned on. Note, that the light sensors should always be on in a "listening" mode to be able to detect if the enclosure is opened.

In an embodiment that uses multiple subsets of light sources, the subset that is selected to be turned on at a particular time may be selected randomly. For example, a random number generator may be used to generate a bit. If the bit is equal to 1 then a light source is turned on, and if the bit is equal to 0, the light source remains off. Also, a set of more than one light source may be randomly turned on and off. During initialization or development of the electronic device several sets of light sources are provided, each light source can be in one or multiple sets at the same time. If it is decided to turn on some light sources, a random number generator (not shown) generates a number N, and all light sources that are in the set of light sources number N are turned on while other sets of light sources are turned off.

In addition, a set of light sources may be turned on based on a particular activity or operation of the electronic device. That is, each activity of a device is associated with a specific subset of light sources. When the activity occurs, the chosen subset is turned on and other light sources are turned off. Activities include a software procedure, activity of a hardware block, user action, etc.

Once a subset of light sources is chosen to be turned on, it can be decided when to turn the subset on. One way to turn on a subset is by user action with respect to the electronic device. For example, a different set of light sources is enabled for different user activities such as pressing a button or touchscreen or interacting with the device in some way. Another way to determine which subset of light sources to turn on is by a program procedure. That is, typical computer programs have many functions and procedures. A set of light sources can be assigned to be turned on when the computer program starts to execute a particular function. Also, each instruction of a computer program can be associated with a different set of light sources. For every executed instruction a different set of light sources can be turned on. Likewise, a set of light sources can be associated with each device mode such as sleeping, safe-mode, recovery mode, low power mode, normal mode, secure mode etc. In another embodiment, hardware blocks of an electronic device such as for example, a radio, a graphics processing unit (GPU), a cryptographic unit, one or more central processing units (CPUs), and hardware accelerators can be associated with a different set of light sources and thus a set will be turned on when a particular hardware block is in use. Also, time intervals can be used to turn on a set of light sources. A set of light sources may be turned on based on regular or randomly chosen time intervals, e.g., every several milliseconds. Note, that it is possible to combine several of these approaches. Also, several sets of light sources may be on at the same time. For example, a decision to turn on a light source may be based on several hardware blocks being in use at the same time.

Figure 5:
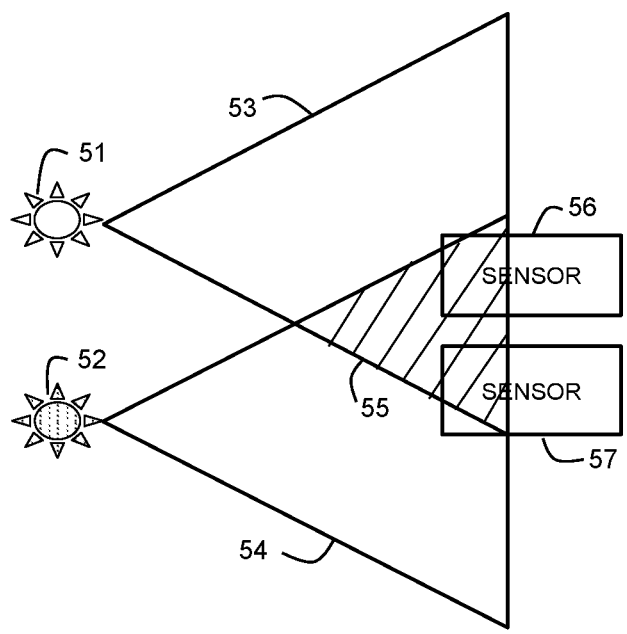
FIG. 5 illustrates an example arrangement of light sources and sensors of different wavelengths.

FIG. 5 illustrates an example arrangement of light sources and sensors of different wavelengths. As an example, light source 51 may provide light of one wavelength and light source 52 may provide light of a different wavelength. In one embodiment, the wavelengths may be in the range of visible light such as red, green, and blue. Another embodiment may include light outside of the visible light range such as infrared (IR) or ultraviolet (UV). Light sensor 56 may only be sensitive to the light emitted by light source 51, and light sensor 57 may only be sensitive to light emitted by light source 52. Both sensors may be illuminated by both of light sources 51 and 52 as shown by the overlap region 55. Using pairs of light sources and light sensors of different wavelengths may make any physical attack more challenging because there are more parameters and configurations for an attacker to overcome. If several light sensors are sensitive to specific wavelengths, such as in FIG. 5, then an attacker may not be able to work on a device lit with, e.g., a specific colored light such as red light. Moreover, if several light sensors are sensitive to a specific wavelength and several light sources are also specific to these wavelengths then they may not interfere with each other even if both sensors are illuminated by light sources at the same time.

Light source parameters that can be changed to introduce more variety into the system may include a width of a light beam emitted by the light source. For example, some lights may provide a very narrow beam, others may provide wider beams, while yet others may provide a very wide flood light type beam. In addition, a bandwidth of the light can be specific to just a narrow band or wide band of wavelength that is emitted or detected. Also, some light sources can emit light that is variable in terms of luminosity or intensity. The luminosity can be changed for different operations. Some light sources may include light emitting diodes (LEDs), or RBG light sources such as those used in a camera.

If light sensors and light sources can be placed in random locations in different devices then the attacker will not be able to devise an attack plan that will work with all devices of a particular product line. To make each device more unique with respect to the profile determined from light sensor characteristics during normal operations, and to increase the difficulty of profiled attacks, it is possible to use multiple layouts of reflective, partially reflective, and non-reflective materials or coatings for the internal part of the device. If the layout of light sources, light sensors, and reflective and non-reflective materials is somehow different for each device, then the sensors, even if placed in the same position, will register different amounts of light. Moreover, these patterns can be randomly generated for each device.

Figure 6:
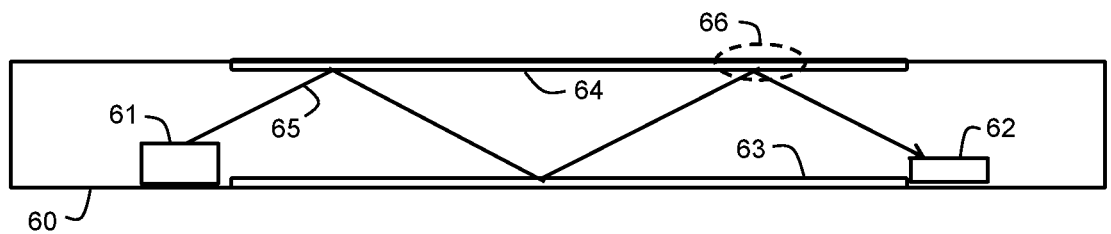
FIG. 6 illustrates example enclosures with light being directed across the enclosure multiple times using reflectors.

FIG. 6 illustrates an example enclosure 60 with light being directed across the enclosure multiple times using reflectors according to an embodiment. Enclosure 60 includes light source 61, light sensor 62, and reflectors 63 and 64. Reflectors 63 and 64 may be attached to opposite walls of enclosure 60. Light source 61 may be directional with a narrow beam. The narrow beam may be directed at one of the reflectors so that it reflects back and forth across the enclosure several times before reaching light sensor 62. A small change in the angles and position or placement of the light source and light sensor due to random variations can create some differences in profiles created from the light sensors. For example, if a portion 66 of enclosure 60 is distorted, e.g., during an attempted opening, this may redirect the light beam a small amount so that light sensor 62 does not record the same amount of light. Using multiple reflections inside the enclosure may result in the tampering detection system being more sensitive to tampering.

Figure 7:
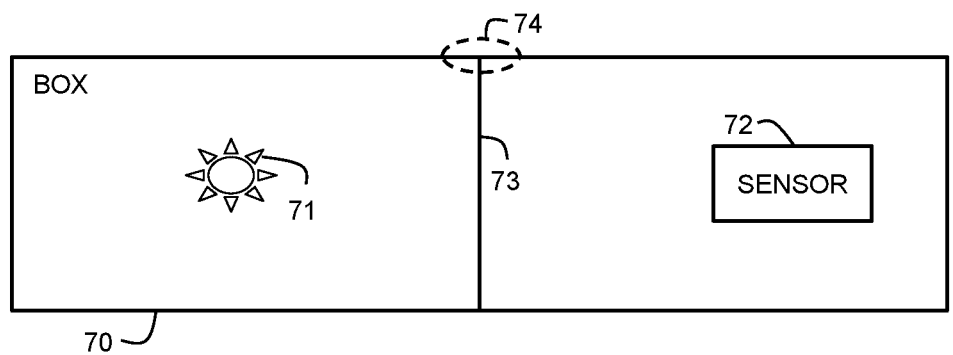
FIG. 7 illustrates an enclosure with light source and sensor separated by an opaque material in accordance with an embodiment.

FIG. 7 illustrates an example enclosure 70 with light source 71 and light sensor 72 separated by an opaque material 73 in accordance with an embodiment. When intact, the opaque material allows very little or no light to pass from light source 71 to light sensor 72. If the opaque material is light weight and easily broken, a distortion 74 in enclosure 70 caused by an attempted opening may allow more light to pass to light sensor 72, thus triggering an indication of tampering.

Figure 8:
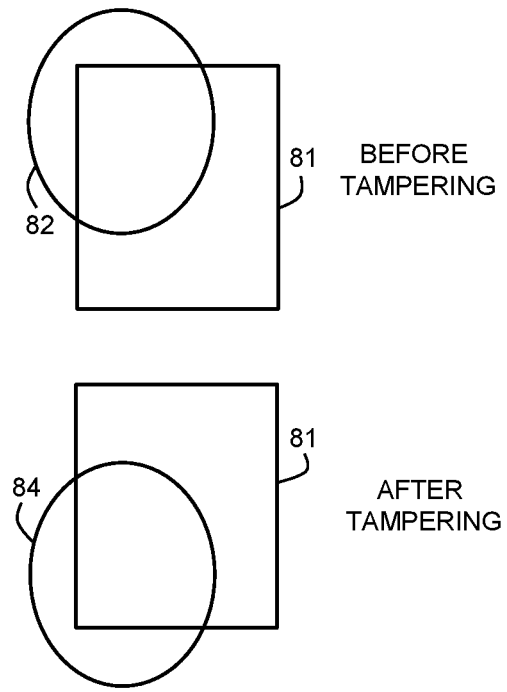
FIG. 8 illustrates a top-down view of large sensors with different illuminated areas from a light source before and after tampering with an enclosure.

FIG. 8 illustrates a top-down view of relatively large sensor 81 with different illuminated areas from a light source (not shown) before and after tampering with an enclosure. Before the tampering, a beam 82 from the light source illuminates the top left of light sensor 81. After tampering with the enclosure, a beam 84 from the light source may be shifted to the bottom left corner. Because approximately the same surface area of light sensor 81 is illuminated both before and after tampering, the tampering may not be detected. To prevent this scenario, small light sensors may be used instead of large sensors to be able to distinguish small variations and avoid situations when one large sensor is still registering the same amount of light after the enclosure was tampered with.

Figure 9:
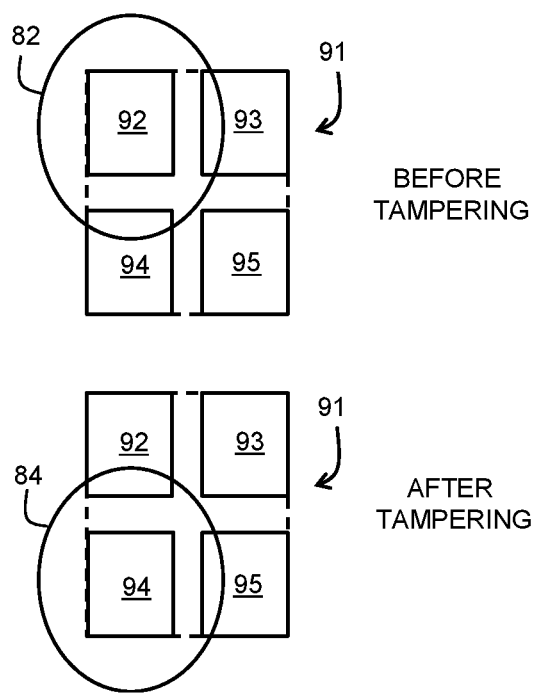
FIG. 9 illustrates a top-down view of an array of sensors with different illuminated areas from a light source before and after tampering with an enclosure.

FIG. 9 illustrates a top-down view of an array of relatively smaller light sensors 91 replacing the single larger light sensor of FIG. 8 before and after tampering with an enclosure. Array of light sensors 91 includes light sensors 92-95 that can each sense light separately from the other light sensors in array 91. In another embodiment, array 91 may have a different number of light sensors arranged differently. In FIG. 9, the same beam 82 as in FIG. 8 illuminates all of light sensor 92 and small portions of light sensors 93 and 94. After tampering causes the light source to shift a small amount, shifted beam 84 illuminates all of light sensor 94 and small portions of 92 and 95. This change in illuminated light sensors would result in more reliable tampering detection than the use of one larger sensor.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A tamper detection system for an enclosure of an electronic device, comprising:

a light source mounted inside the enclosure;

a light sensor mounted inside the enclosure, the light sensor spaced apart and separate from the light source, wherein the light sensor is configured to sense light emitted by the light source, the light sensed by the light sensor having a characteristic;

a tamper detection circuit connected to the light source and the light sensor, the tamper detection circuit configured to turn the light source on and off on a predetermined time interval, and to detect tampering of the enclosure when light sensed by the light sensor does not compare favorably to a stored characteristic, wherein the tamper detection system further comprises a plurality of light sources and light sensors, each light source of the plurality of light sources being selectively turned on for a corresponding predetermined time interval, wherein the corresponding predetermined time interval is different for each of the light sources.

2. The tamper detection system of claim 1, further comprising a reflective material positioned in the enclosure to reflect the emitted light from the light source to the light sensor.

3. The tamper detection system of claim 1, wherein the stored characteristic comprises one or more of wavelength and intensity.

4. The tamper detection system of claim 1, wherein the light source and the light sensor are randomly turned on and off.

5. The tamper detection system of claim 1, wherein the light sensor further comprises an array of sensors.

6. The tamper detection system of claim 1, wherein the stored characteristic is recorded during an initialization phase of the tamper detection system during a normal untampered with condition of the enclosure to produce the stored characteristic.

7. The tamper detection system of claim 1, wherein the characteristic of the light is stored in a non-volatile memory of a secure element.

8. The tamper detection system of claim 1, further comprising an opaque barrier between the light source and the light sensor, wherein the opaque barrier is configured to break when the enclosure is tampered with.

9. A tamper detection system for an enclosure of an electronic device, comprising:

a light source mounted inside the enclosure;

a light sensor mounted inside the enclosure, the light sensor spaced apart and separate from the light source, wherein the light sensor is configured to sense light emitted by the light source, the light sensed by the light sensor having a characteristic;

a tamper detection circuit connected to the light source and the light sensor, the tamper detection circuit configured to turn the light source on and off on a predetermined time interval, and to detect tampering of the enclosure when light sensed by the light sensor does not compare favorably to a stored characteristic, wherein the tamper detection system further comprises a plurality of light sources and a plurality of light sensors organized as light source and sensor pairs, wherein each of the light source and sensor pairs configured to emit and sensor light of a different wavelength than other light source and sensor pairs of the tamper detection system.

10. A method for detecting tampering of an enclosure of an electronic device, the method comprising:

emitting light using a light source mounted on an inside of the enclosure during a normal operation of the electronic circuit;

sensing light using a light sensor mounted inside the enclosure during the normal operation, the light sensor spaced apart and separate from the light source, wherein the light source is randomly turned on and off on a predetermined time interval;

comparing a characteristic of the light sensed during the normal operation to a stored characteristic; and detecting tampering with the enclosure when the light sensed during the normal operation does not compare favorably to the stored characteristic.

11. The method of claim 10, further comprising:

during an initialization phase, emitting light from the light source;

sensing the emitted light, during the initialization phase, using the light sensor mounted inside the enclosure; and storing the characteristic of the light sensed by the light sensor to produce the stored characteristic.

12. The method of claim 10, further comprising reflecting the emitted light from the light source to the light sensor with a reflective material positioned in the enclosure.

13. The method of claim 10, wherein the stored characteristic comprises one or more of wavelength and intensity.

14. The method of claim 10, further comprising a non-reflective material positioned within the enclosure between the light source and the light sensor to block a part of the light sensed by the light sensor.

15. The method of claim 10, wherein the light sensor further comprises an array of sensors.

16. A method for detecting tampering of an enclosure of an electronic device, the method comprising:

during an initialization phase, emitting light from a light source mounted inside the enclosure;

sensing the emitted light, during the initialization phase, using a light sensor mounted inside the enclosure, wherein the light sensor is spaced apart and separate from the light source;

storing a characteristic of the light sensed by the light sensor;

during a normal operation of the electronic circuit, emitting light using the light source;

during the normal operation, sensing light from the light source using the light sensor, wherein the light source is turned on and off on a predetermined time interval; and comparing a characteristic of the light sensed during the normal operation to the stored characteristic; and detecting tampering with the enclosure when the light sensed during the normal operation does not compare favorably to the stored characteristic.

17. The method of claim 16, wherein the stored characteristic comprises one or more of wavelength and intensity.

18. The method of claim 16, further comprising reflecting the emitted light from the light source to the light sensor with a reflective material positioned in the enclosure.

* * * * *